US012275461B2

(12) United States Patent
Forte

(10) Patent No.: US 12,275,461 B2
(45) Date of Patent: Apr. 15, 2025

(54) STEERING COLUMN FOR A STEER-BY-WIRE STEERING SYSTEM FOR A MOTOR VEHICLE

(71) Applicants: thyssenkrupp Presta AG, Eschen (LI); thyssenkrupp AG, Essen (DE)

(72) Inventor: Sebastian Forte, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 933 days.

(21) Appl. No.: 17/417,165

(22) PCT Filed: Jan. 22, 2020

(86) PCT No.: PCT/EP2020/051448
§ 371 (c)(1),
(2) Date: Jun. 22, 2021

(87) PCT Pub. No.: WO2020/152188
PCT Pub. Date: Jul. 30, 2020

(65) Prior Publication Data
US 2022/0073127 A1  Mar. 10, 2022

(30) Foreign Application Priority Data
Jan. 24, 2019  (DE) ................ 10 2019 200 908.5

(51) Int. Cl.
 B62D 5/00  (2006.01)
 B62D 1/181  (2006.01)
 (Continued)

(52) U.S. Cl.
 CPC ............. B62D 5/006 (2013.01); B62D 1/181 (2013.01); B62D 1/185 (2013.01); B62D 1/195 (2013.01)

(58) Field of Classification Search
 CPC ........ B62D 5/006; B62D 1/181; B62D 1/185; B62D 1/195
 See application file for complete search history.

(56) References Cited

U.S. PATENT DOCUMENTS

2011/0239809 A1   10/2011   Beneker et al.
2017/0361863 A1 * 12/2017   Rouleau ............. B62D 1/195
(Continued)

FOREIGN PATENT DOCUMENTS

DE   199 02 557 A   7/2000
DE   100 33 810 A   1/2002
(Continued)

OTHER PUBLICATIONS

DE-10033810-A1 translation (Year: 2002).*
English Translation of International Search Report issued in PCT/EP2020/051448, dated May 25, 2020.

*Primary Examiner* — Christopher B Wehrly
(74) *Attorney, Agent, or Firm* — thyssenkrupp North America, LLC

(57) ABSTRACT

A steering column for a steer-by-wire steering system may include a casing unit in which a steering spindle is received such that the steering spindle is rotatable about a longitudinal axis. The casing unit may have an inner casing tube, which is rotatable and longitudinally displaceable, received coaxially in an outer casing tube. The steering spindle may have a longitudinally displaceable inner shaft that is received coaxially in an outer shaft in a torque-transmitting manner. The steering spindle may be coupled to a drive unit of a feedback actuator that has an electric motor for the generation and introduction of a feedback torque into the steering spindle. The drive unit has a recess that is arranged coaxially with respect to the longitudinal axis, is open (Continued)

toward the outer shaft, and has a maximum inscribed internal diameter that is greater than an external diameter of the outer shaft.

12 Claims, 7 Drawing Sheets

(51) Int. Cl.
*B62D 1/185* (2006.01)
*B62D 1/19* (2006.01)

(56) References Cited

U.S. PATENT DOCUMENTS

| | | |
|---|---|---|
| 2018/0154925 A1 | 6/2018 | Steinkogler |
| 2018/0251147 A1 | 9/2018 | Thyssenkrupp et al. |
| 2018/0319419 A1 | 11/2018 | Kreutz |
| 2019/0016365 A1 | 1/2019 | Swamidason |
| 2020/0346682 A1 | 11/2020 | Forte |

FOREIGN PATENT DOCUMENTS

| | | | |
|---|---|---|---|
| DE | 10033810 A1 * | 1/2002 | ............. B62D 1/185 |
| DE | 10 2009 017 054 A | 10/2010 | |
| DE | 10 2015 007 280 A | 12/2016 | |
| DE | 10 2015 224 602 A | 6/2017 | |
| DE | 10 2018 101 528 A | 7/2019 | |
| EP | 3 192 718 A | 7/2017 | |
| KR | 20100031947 A | 3/2010 | |
| WO | 2012/162708 A | 12/2012 | |
| WO | 2017009125 A1 | 1/2017 | |

* cited by examiner

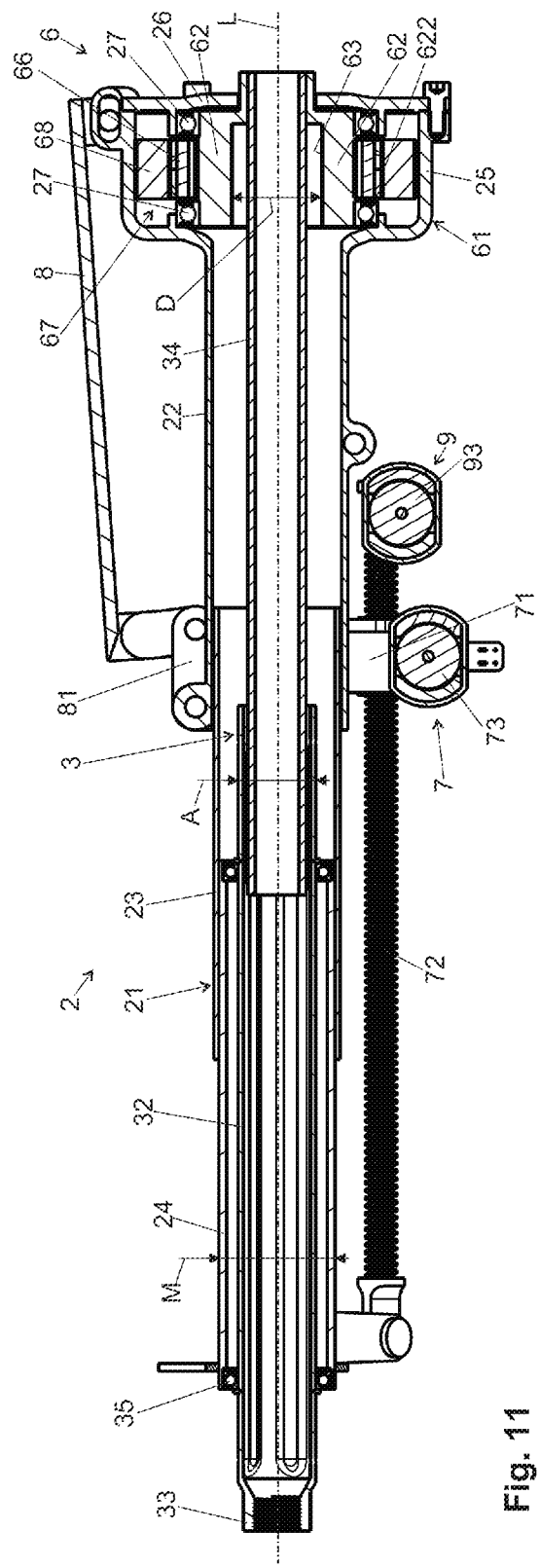
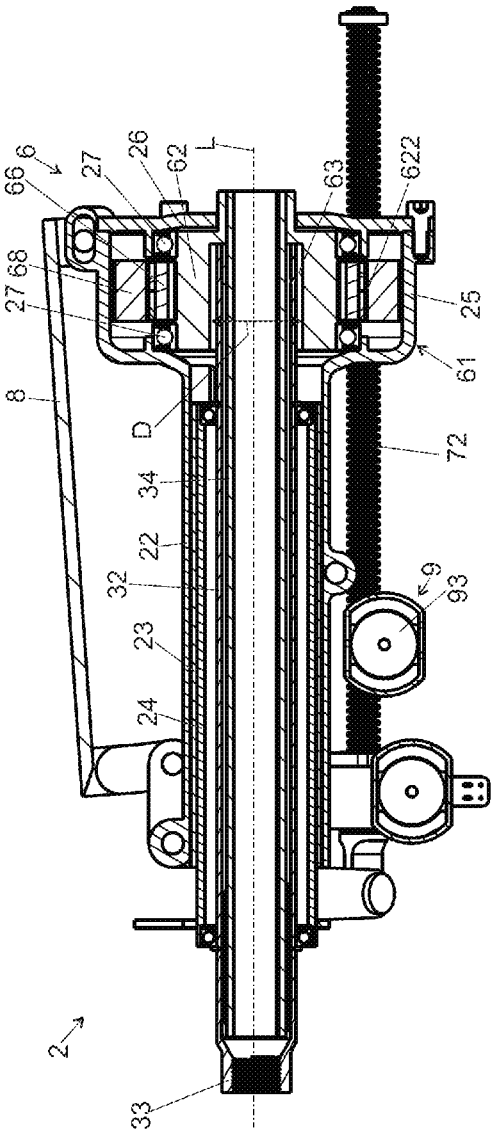
Fig. 11
Fig. 12

STEERING COLUMN FOR A STEER-BY-WIRE STEERING SYSTEM FOR A MOTOR VEHICLE

CROSS REFERENCE TO RELATED APPLICATIONS

This application is a U.S. National Stage Entry of International Patent Application Serial Number PCT/EP2020/051448, filed Jan. 22, 2020, which claims priority to German Patent Application No. DE 10 2019 200 908.5, filed Jan. 24, 2019, the entire contents of both of which are incorporated herein by reference.

FIELD

The present disclosure generally relates to steering columns, including steering columns for steer-by-wire steering systems in motor vehicles.

BACKGROUND

Steer-by-wire steering systems for motor vehicles receive manual steering commands of the driver in the same way as conventional mechanical steering systems by way of rotation of a steering wheel which is fastened to the steering column on the driver side at the rear end (with regard to the driving direction) of the steering spindle. A steering command which is introduced into the steering spindle is detected by means of a rotary angle and/or torque sensors, and an electric control signal which is generated therefrom is output to a steering actuator which sets a corresponding steering angle of the wheels by means of an electric actuating drive.

In the case of steer-by-wire systems, the driver does not receive direct mechanical feedback from the steered wheels via the steering line, which feedback, in the case of conventional mechanically coupled steering systems, is fed back to the steering wheel as a reaction or self-aligning torque in a manner which is dependent on the roadway condition, the vehicle speed, the current steering angle and further operating states. An absence of haptic feedback makes it difficult for the driver, however, to reliably detect current driving situations and to carry out suitable steering maneuvers, as a result of which the vehicle steering capability and therefore the driving safety are impaired.

In order to generate a realistic driving feel, it is known in the prior art for parameters such as vehicle speed, steering angle, steering reaction torque and the like to be detected from an actual instantaneous driving situation, or to be calculated in the simulation, and for a feedback signal to be formed from said variables, which feedback signal is fed into a feedback actuator. The feedback actuator is integrated into the steering column and has an actuating unit which comprises an electric actuating drive which serves as a manual torque actuator or steering wheel actuator and has a drive unit. The drive unit comprises an electric motor, and couples a self-aligning torque (feedback torque) which corresponds to the real reaction torque via the steering spindle into the steering wheel in a manner which is dependent on the feedback signal. "Force feedback" systems of this type give the driver the impression of a real driving situation as in the case of a conventional, mechanically coupled steering system, which facilitates an intuitive reaction.

It is known for the steering column to be of adjustable design in the longitudinal direction, that is to say in the axial direction of the steering spindle or in the direction of the longitudinal axis, in order for the steering wheel to be adapted to the driver's position in manual driving operation into an operating position for a comfortable manual steering intervention. In the case of autonomous driving, the steering column is preferably retracted longitudinally as far as possible in autonomous driving operation, in which no manual steering intervention takes place, in order to move the steering wheel into a stowage position outside the operating position, with the result that the vehicle interior compartment is freed up for another use. In order to realize the adjustment and stowage, it is known in the prior art, for example from DE 2015 007 280 A1, that the casing unit has an adjustable-length telescopic arrangement with at least one inner casing tube which dips into an outer casing tube, and the correspondingly likewise variable-length steering spindle has a hollow outer shaft and an inner shaft which dips into the latter in an axially displaceable manner, the steering torque being transmitted via a torque-transmitting connection which has, for example, non-circular positively locking elements.

The previously known drive unit has a steering shaft section which can be coupled via an axial coupling to the front end of the steering spindle. The fact that the length of said steering shaft section is added to the length of the steering spindle results in a relatively great overall length of the steering column, to be precise even in the maximum retracted stowage position.

Thus, a need exists to make a shorter overall length in the stowage position possible in the case of a steer-by-wire steering column.

BRIEF DESCRIPTION OF THE FIGURES

FIG. 11 is a longitudinal sectional view through the steering column according to FIG. 10 in an extended state.

FIG. 12 is a longitudinal sectional view through the steering column as in FIG. 11 in a retracted state.

DETAILED DESCRIPTION

Figure 1:
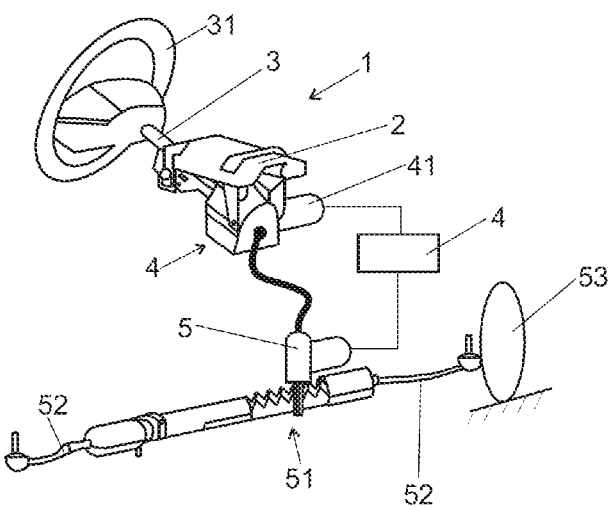
FIG. 1 is a diagrammatic view of an example steer-by-wire steering system.
Figure 2:
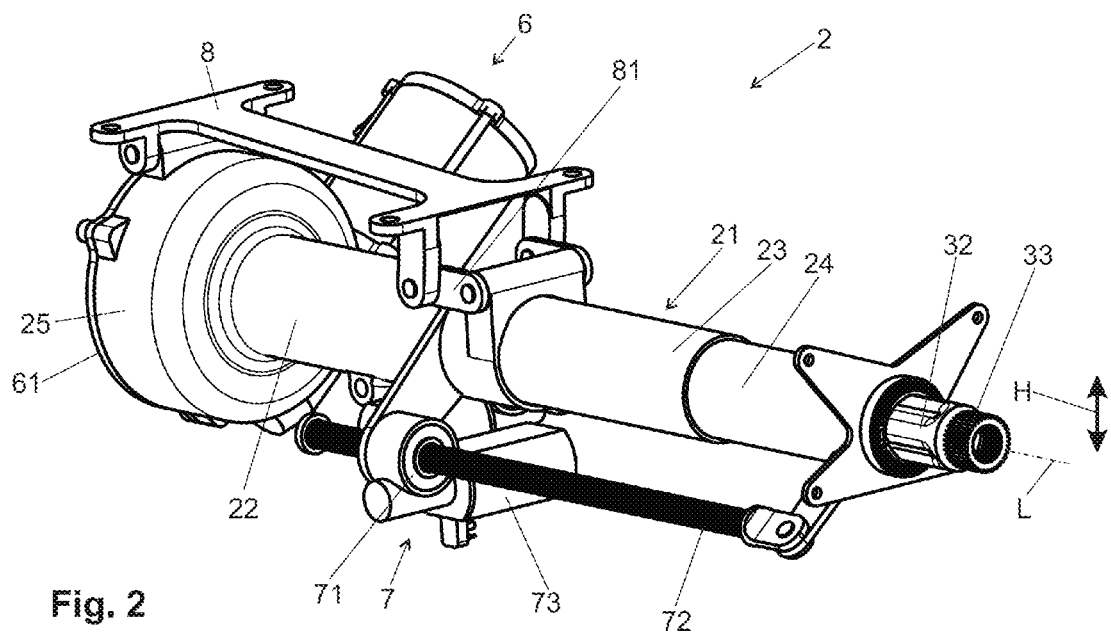
FIG. 2 is diagrammatic perspective view of an example steering column.
Figure 3:
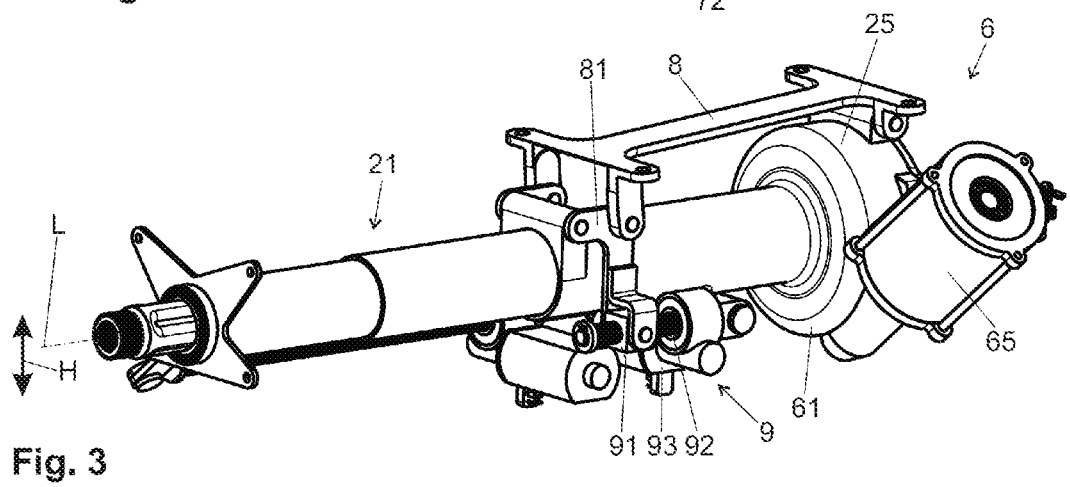
FIG. 3 is another diagrammatic perspective view of the steering column of FIG. 2.
Figure 4:
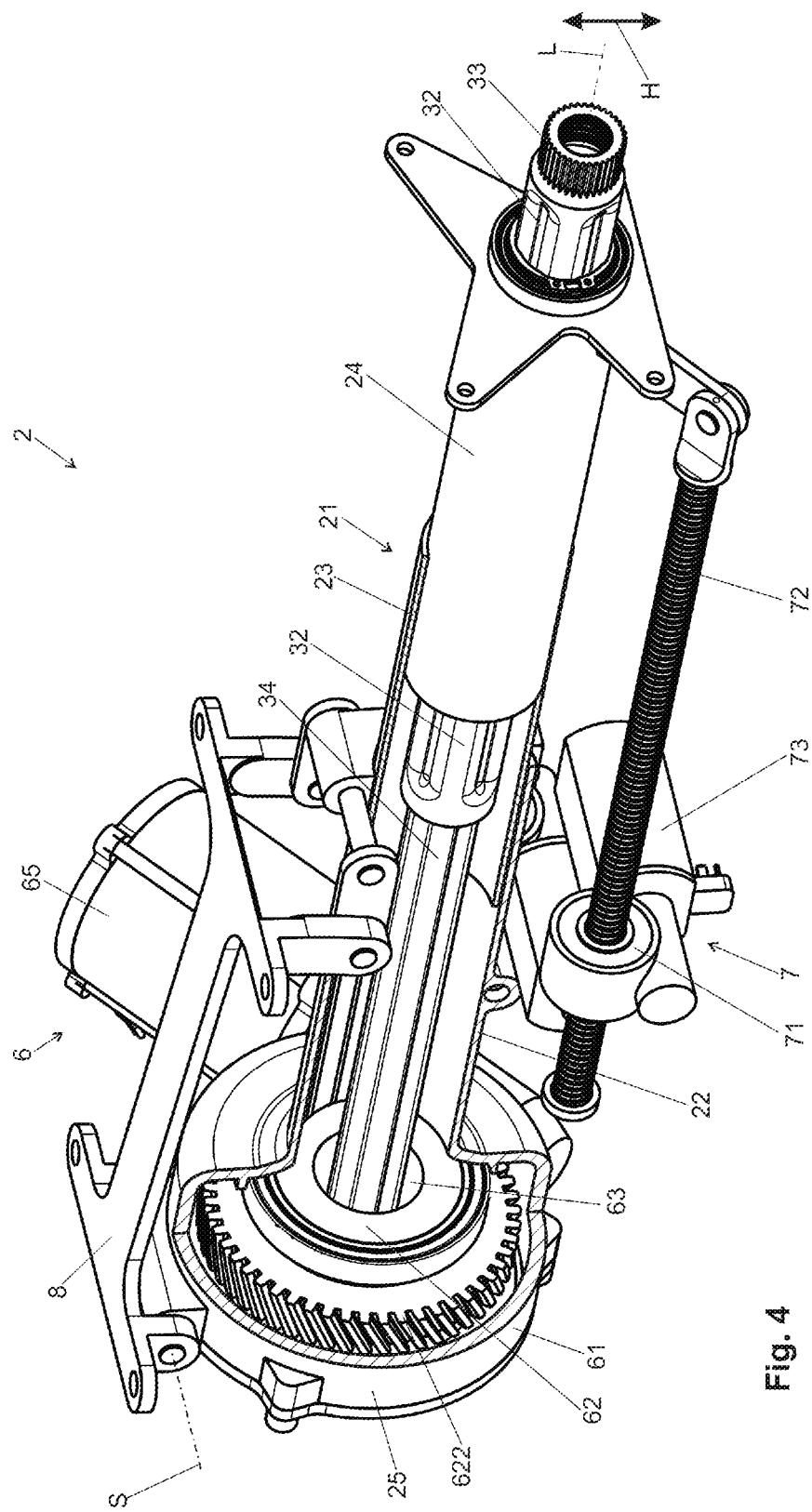
FIG. 4 is a partial cut-away view of the steering column of FIG. 2.
Figure 5:
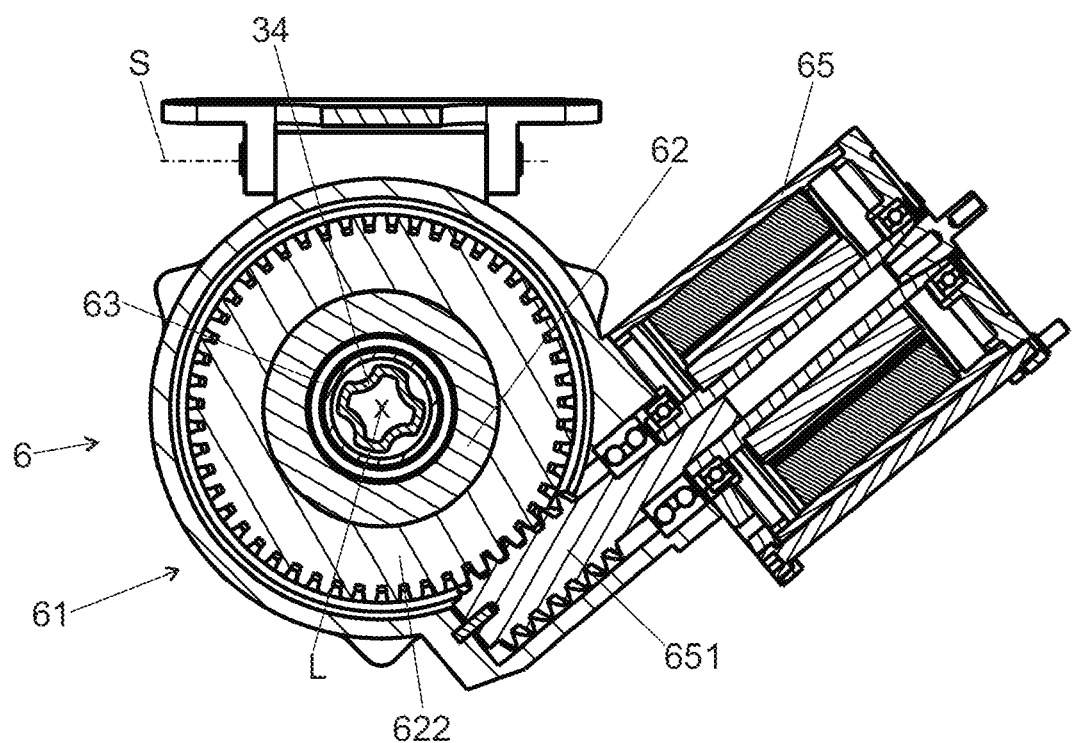
FIG. 5 is a cross-sectional view of the steering column of FIGS. 2 to 4.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for steer-by-wire steering systems of motor vehicles. In some examples, such a steering column may include comprising a casing unit, in which a steering spindle is received such that it can be rotated about a longitudinal axis, the casing unit having an inner casing tube which is received coaxially in an outer casing tube such that it can be displaced telescopically in the direction of the longitudinal axis, and the steering spindle having an inner shaft which is received coaxially in an outer shaft in a torque-transmitting manner and such that it can be displaced telescopically in the direction of the longitudinal axis, it being possible for the steering spindle to be connected to a steering wheel, and said steering spindle being coupled to a drive unit of a feedback actuator which has an electric motor for the generation and introduction of a feedback torque into the steering spindle.

According to the invention, it is provided, in the case of a steering column for a steer-by-wire steering system for a motor vehicle, comprising a casing unit, in which a steering spindle is received such that it can be rotated about a longitudinal axis, the casing unit having an inner casing tube which is received coaxially in an outer casing tube such that it can be displaced telescopically in the direction of the longitudinal axis, and the steering spindle having an inner shaft which is received coaxially in an outer shaft in a torque-transmitting manner and such that it can be displaced telescopically in the direction of the longitudinal axis, it being possible for the steering spindle to be connected to a steering wheel, and said steering spindle being coupled to a drive unit of a feedback actuator which has an electric motor for the generation and introduction of a feedback torque into the steering spindle, that the drive unit has a recess which is arranged coaxially with respect to the longitudinal axis, is open toward the outer shaft (=on its side which faces the outer shaft), and has a maximum inscribed internal diameter which is greater than the external diameter of the outer shaft.

The steering wheel is attached to the one rear end (with regard to the driving direction) of the steering shaft. The drive unit of the feedback actuator is arranged at the other, front end (with regard to the driving direction) of the steering shaft. There, the self-aligning or feedback torque which is generated by the electric motor is coupled into the shaft part which can be adjusted telescopically relative to the steering wheel, preferably into the inner shaft which is arranged in the front region and dips in an adjustable manner into the front end of the outer shaft which is arranged in the rear region, is configured as a hollow shaft, and carries the steering wheel at its rear end.

The maximum inscribed diameter can also be called the diameter of what is known as the maximum inscribed circle which corresponds to the maximum diameter of a free, circular passage through the recess. In one preferred embodiment, the recess has a circular-cylindrical basic shape, that is to say in other words is configured as a circular-cylindrical opening, the maximum inscribed diameter corresponding in this case to the diameter of the circular-cylindrical basic shape, that is to say the internal diameter of the circularly round opening of the recess. The circularly round opening is preferably coaxial with respect to the longitudinal axis.

If the outer shaft has an outer cross section which differs from a circular cylinder, for example a non-round shape for the realization of a torque-transmitting connection to the inner shaft, the external diameter of the outer shaft is understood to mean the enveloping circle diameter of the non-round outer cross section. Therefore, the teaching according to the invention also includes outer and/or inner shafts with an outer cross section which is not circular-cylindrical, for example prismatic, serrated or with what is known as a cloverleaf profile which has arcuately shaped radial grooves and projections in cross section.

The recess according to the invention with a maximum inscribed diameter which is greater than the external diameter of the outer shaft makes it possible that, in the case of telescoping retraction of the steering column, the outer shaft dips at least partially with its front end region into the drive component, that is to say can be pushed in axially. This can take place in the case of the adjustment for shortening the steering column, in particular in the case of maximum retraction into the stowage position. Here, it is a special advantage of the invention that the steering spindle including the outer shaft is accommodated in the drive unit in the direction of the longitudinal axis, with the result that compact dimensions with a short stowage length can be realized, which is advantageous, in particular, for use in the case of autonomous driving.

In the case of a crash, by virtue of the fact that a body impacts with high kinetic energy onto the steering wheel, the steering column can likewise yield and be retracted, in order to decrease the risk of injury. Here, the steering spindle is likewise pushed together. Thanks to the invention, the outer shaft can dip into the drive unit, with the result that a great displacement travel is available, on which, in the case of a crash, the body can be braked in a controlled manner by means of suitable energy absorption apparatuses which are integrated into the steering column and are known from the prior art. The overall length which is taken up by the feedback actuator is available, as a result of the recess in the drive unit, as a displacement travel for the steering shaft, as a result of which a long displacement travel for energy absorption is made possible in the case of a compact overall length.

The recess is open on its side which faces the outer shaft, with the result that the outer shaft can dip with its front end at the front through the opening of the recess into the annular space which is formed between the inner shaft and the inner wall of the recess. The recess can be closed on its front side of the drive unit which faces away from the casing unit, since, in the case of a steer-by-wire steering column, the steering shaft does not as a rule have to be guided through the steering column toward the front. The recess can preferably be configured as a blind opening which is closed on its end which faces away from the steering shaft. As a result, a cup-shaped arrangement can be formed, in which the front end region of the steering spindle, which end region dips into the blind opening, is protected against external influences.

It is advantageous that the internal diameter is smaller than the external diameter of the inner casing tube. The inner casing tube has the smallest external diameter of the casing tubes of the casing unit. By virtue of the fact that the recess has a smaller diameter than the inner casing tube, only the steering shaft is situated in the recess, and the drive unit can be designed with smaller dimensions, which is advantageous with regard to a compact overall design.

It can be provided that the length of the inner casing tube or the outer casing tube is smaller than the length of the outer shaft. By virtue of the fact that, according to the invention, the outer shaft can dip with at least part of its length into the recess, it can preferably be received in the retracted stowage position for the most part in the inner casing tube or outer casing tube, even if the inner or outer casing tube is shorter than the outer shaft by the length of the recess. As a result of the shorter inner casing tube, a high rigidity and shorter dimensions of the steering column can be made possible in the retracted stowage position.

One advantageous embodiment of the invention provides that at least one intermediate casing tube is arranged in a telescopically adjustable manner between the inner casing tube and the outer casing tube. If the casing unit has only an inner and outer casing tube, a two-piece telescope is formed. If one or more telescopic intermediate casing tubes are inserted between the inner and outer casing tube, a three-piece or multiple-piece telescope is formed. This has the advantage that, in the case of a given, maximum extended operating length of the casing unit, a shorter stowage length in the maximum retracted stowage position is made possible.

The internal diameter of the recess can preferably be smaller than the external diameter of the inner casing tube and, in the case of a multiple-piece telescope, is particularly preferably smaller than the external diameter of the intermediate casing tube and, in the case of a plurality of intermediate casing tubes, is smaller than that of the intermediate casing tube with the smallest external diameter. As a result, the drive unit can have a smaller diameter, and a compact overall design is made possible.

It can be provided that the casing unit is configured with at least one intermediate casing tube as a three-piece or multiple-piece telescope, the steering shaft being configured as a two-piece telescope consisting of an inner shaft and an outer shaft. As a result, the steering shaft has fewer telescopic elements than the casing unit, and a higher rigidity of the steering column can be achieved as a result. Here, by virtue of the fact that, according to the invention, the steering shaft is received at least partially in the recess, the stowage length can be of particularly compact design in the retracted stowage position. In the case of a predefined pull-out length of the steering column, measured as a difference between the length in the maximum extended state and the maximum retracted state, the respective length of the outer, intermediate and the inner casing tube in the case of the three-piece telescope can be shorter than the respective length of the outer shaft of the two-piece telescope of the steering spindle. Here, the invention affords the particular advantage that the outer shaft can be moved beyond the outer casing tube as far as into the recess into the drive unit. By virtue of the fact that the external diameter of the inner casing tube is greater than the internal diameter of the recess, said inner casing tube cannot be moved into the recess, which is compensated for, however, by way of the greater pull-out ratio of the three-piece telescope between a maximum extended and a maximum retracted state. As a result, a higher pull-out ratio in the case of high rigidity can be realized thanks to the invention.

It can be provided that the drive unit has a drive wheel which coaxially surrounds the recess at least partially, can be coupled to the steering spindle, and can be driven rotationally by the electric motor. The drive wheel can be configured as a gearwheel which is connected via a gear mechanism to the electric motor. The gearwheel can be, for example, a worm gear, gearwheel or belt pulley, which is configured as a ring gear. The recess according to the invention is situated at least partially within the opening, through which the steering spindle can extend. The coaxial arrangement of the drive wheel is advantageous for a compact construction.

The drive wheel can be connected to the inner shaft, preferably fixedly for conjoint rotation. In its front end region which dips axially into the recess, the steering spindle can be connected to the drive unit. The inner shaft can extend coaxially through the recess and the gearwheel and, in its front end region which is situated in the front end region of the recess, which end region faces away from the steering shaft, can be coupled in a torque-transmitting manner to the drive wheel fixedly or releasably via suitable connecting means. The outer shaft can be pushed axially into the free annular space between the inner shaft and the recess by way of axial displacement toward the drive unit.

The gearwheel can have a toothing system which runs around over the circumference and can advantageously be configured from a plastic, for example from a thermoplastic polymer, such as, for example, polyoxymethylene (POM), polypropylene (PP) or the like. The toothing system can be manufactured using the plastic injection molding method, and can preferably be integrally molded onto a preferably metallic core element which is manufactured, for example, from steel and has a hub for rotatable mounting on the steering column. The plastic toothing system provides a high level of smooth running and low-wear operation, and the metallic core element ensures high rigidity and load-bearing capacity.

As an alternative, the drive wheel can also be configured integrally with the rotor of the electric motor. As a result, a direct drive can be realized, in the case of which the drive unit has a stator which surrounds the rotor, and no further gear mechanism members are required.

It can be provided that the drive unit is attached to an outer casing tube. As a result, the feedback torque is supported on the casing unit. The attachment to the outer casing tube makes a construction which saves installation space possible. A coaxial arrangement relative to the longitudinal axis is particularly advantageous. Here, the drive wheel can preferably be mounted on the outer casing tube such that it can be rotated about the longitudinal axis.

In one advantageous embodiment, the casing unit can have a bell-shaped housing of the drive unit. A bell-shaped, preferably closed housing which has an enlarged diameter relative to the outer casing tube can preferably be of rotationally symmetrical configuration with respect to the longitudinal axis, and can be attached coaxially to the outer casing tube. In the housing, the drive wheel can be mounted in a protected manner and can be connected to the steering spindle. In one advantageous embodiment, the bell-shaped housing can be formed at least partially by way of a widened section of the outer casing tube, preferably integrated in one piece with the outer casing tube. The widened section can be formed by way of reshaping of a casing tube which is manufactured from sheet metal, preferably from steel sheet, or by way of the integral design in the case of a casing tube which is configured as a cast part, for example made from cast aluminum or magnesium. In particular, a compact overall design and economic manufacture from a small number of individual parts can be realized by way of an integrated construction. As an alternative, the housing can be flange-connected to the casing tube or can be connected to the latter in an integrally joined manner.

For the longitudinal adjustment of the steering column, it can be provided that a motorized adjusting drive acts between the inner casing tube and the outer casing tube, which adjusting drive is set up for the relative displacement in the direction of the longitudinal axis. For the longitudinal adjustment, a linear motorized actuating drive is used between the inner and outer casing tube. By way of the adjusting drive, the casing tubes can be moved in a translational manner relative to one another in the direction of the longitudinal axis, with the result that the inner casing tube is extended or retracted telescopically relative to the outer casing tube. The adjusting drive can comprise a spindle drive, with a spindle nut which is arranged on a screw spindle, and with a motorized drive, by which the screw spindle and the spindle nut can be driven rotationally relative to one another. Adjusting drives of this type are known in the prior art and are considered to be reliable and robust. Here, the spindle nut is attached to the one casing tube such that it cannot be displaced in the direction of the longitudinal axis, and the screw spindle is attached to another casing tube which can telescope with respect to said one casing tube. The spindle nut or the screw spindle is preferably driven rotationally by an electric actuating motor via a suitable gear mechanism, for example a worm gear mechanism or belt mechanism, as a result of which the spindle nut or screw spindle which is stationary with regard to the rotation relative to said spindle nut or screw spindle is moved in a translational manner in the direction of the spindle longitudinal axis. The adjusting drive can be attached between the inner and outer casing tube, and can also be attached to an intermediate casing tube in the case of a multiple-piece telescope.

It can be provided that a clamping device interacts with the casing unit, which clamping device can be moved into a fixing position, in which it fixes the inner casing tube relative to the outer casing tube, and into a release position, in which it releases a displacement of the inner casing tube relative to the outer casing tube. The clamping device can be capable of being actuated manually or by motor. In the release position, a longitudinal adjustment of the steering column can take place by way of telescoping retraction or extension of the casing tubes. In the fixing position, the casing tubes are connected releasably to one another, for example by way of non-positive bracing or clamping, with the result that the length of the telescope arrangement and therefore the steering wheel position for operation during driving operation are fixed.

The casing unit is preferably held in a carrying unit which can be connected to the body of a motor vehicle. The carrying unit serves to mount the steering column in the motor vehicle and comprises, for example, bracket parts, to which the casing unit is connected. In order to set the steering wheel position, the casing unit can be capable of being adjusted relative to the carrying unit. For height adjustment, the casing unit can be mounted such that it can be pivoted, for example, about a pivot axis which lies transversely with respect to the longitudinal axis, with the result that the steering wheel which is attached to the rear end of the steering spindle can be set vertically relative to the driver's position. The height adjustment can take place manually. In particular, for the automated stowage of the steering column in the case of autonomous driving, it is advantageous that an electric height adjusting drive is connected to the carrying unit and the actuating unit, by which height adjusting drive the casing unit can be moved up or down relative to the carrying unit. A height adjusting drive can be realized, for example, by means of a spindle drive which is driven by electric motor, as described in the preceding text for the longitudinal adjustment. For the fixing of the vertical position, it can be provided that the casing unit can be braced to releasably to the carrying unit by means of a clamping device, as described in the preceding text for the longitudinal adjustment.

FIG. 1 shows a diagrammatic steer-by-wire steering system 1 for a motor vehicle, with a steering column 2 which can be mounted on the body (not shown) of the motor vehicle. In the steering column 2, a steering spindle 3 is mounted such that it can be rotated about its longitudinal axis L. A steering wheel 31 is fastened to the rear end (with regard to the driving direction) of the steering spindle 3, which rear end faces the driver.

A control unit 4 is connected via electric control lines to a rotary angle sensor 41 which, in the case of a steering command which is input by the driver by way of rotation of the steering wheel 31, detects a rotary angle of the steering spindle 3. The control unit 4 generates an electric control signal in a manner which is dependent on the measured rotary angle, and possibly further parameters such as, for example, the vehicle speed, the yaw rate and the like, and in this way actuates an electric motor steering actuator 5 via electric control lines. The steering actuator 5 brings about a steering angle of the steered wheels 53 via a steering gear 51 and track rods 52 which are connected to it.

The steering column 2 has an electric feedback actuator 6 which is coupled to the steering shaft 3 and by which feedback torque can be coupled into the steering spindle 3 in a manner which is dependent on the respective driving situation, which feedback torque simulates the feedback of the roadway on the wheels 53 and transmits it to the steering wheel 31, in order to give the driver feedback about the steering and driving behavior of the vehicle.

The steering column 2 is shown in a first embodiment in FIGS. 2 to 9.

The steering spindle 3 is mounted in a casing unit 21 such that it can be rotated about the longitudinal axis L, which casing unit 21 has an outer casing tube 22, in which an intermediate casing tube 23 is received axially and is arranged such that it can be displaced telescopically in the direction of the longitudinal axis L, in which intermediate casing tube 23 in turn an inner casing tube 24 is likewise arranged coaxially and such that it can be displaced telescopically in the direction of the longitudinal axis L. The inner casing tube 24 has an external diameter M; in the case of a non-round cross section, this is the diameter of the envelope circle. As a result, a three-piece telescope arrangement of the casing unit 21 is formed.

The steering spindle 3 has an outer shaft 32, at the rear end region of which, which prom jects on the driver's side out of the inner casing tube 24, a fastening section 33 is configured for attaching the steering wheel 31 fixedly for conjoint rotation. An inner shaft 34 dips coaxially such that it can be adjusted telescopically in the direction of the longitudinal axis L into the outer shaft 32 which is configured as a hollow shaft, with the result that a two-piece telescope arrangement is formed. The inner shaft 34 and the outer shaft 32 are connected to one another in a torque-transmitting manner for the transmission of the steering torque, for example by way of corresponding non-round cross-sectional profiles, such as polygonal profiles which are known per se from adjustable-length shafts or groove/tooth profiles which extend in the longitudinal direction or the like. The outer shaft 32 has an external diameter A; in the case of a non-round cross section, this is the diameter of the envelope circle. The inner shaft 34 extends as far as into the front end region of the casing unit 21.

Figure 6:
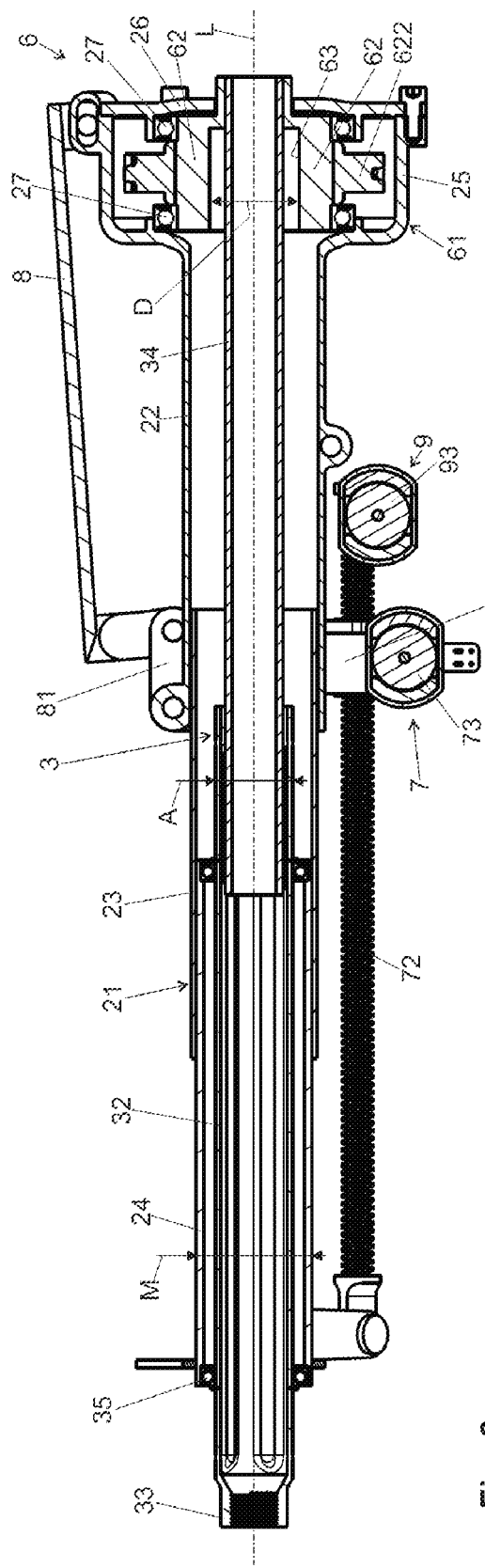
FIG. 6 is a longitudinal sectional view through the steering column of FIGS. 2 to 5 in an extended state.

The longitudinal section in FIG. 6 shows the steering column 2 in the extended state, in which the intermediate casing tube 23 is pushed rearward (to the left in FIG. 6) out of the outer casing tube 22 so as to project in the longitudinal direction, and the inner casing tube 24 is pushed out of the intermediate casing tube 23. The outer shaft 32 is mounted in steering spindle bearings 35 which are preferably configured as anti-friction bearings in the inner casing tube 24 such that it can be rotated about the longitudinal axis L, and is held in the inner casing tube 24 such that it cannot be displaced in the longitudinal direction, that is to say in the direction of the longitudinal axis L, with the result that, in the case of a longitudinal adjustment, it is moved together with said inner casing tube 24. The inner shaft 34 is mounted in the outer casing tube 22 such that it cannot be displaced in the longitudinal direction.

Figure 7:
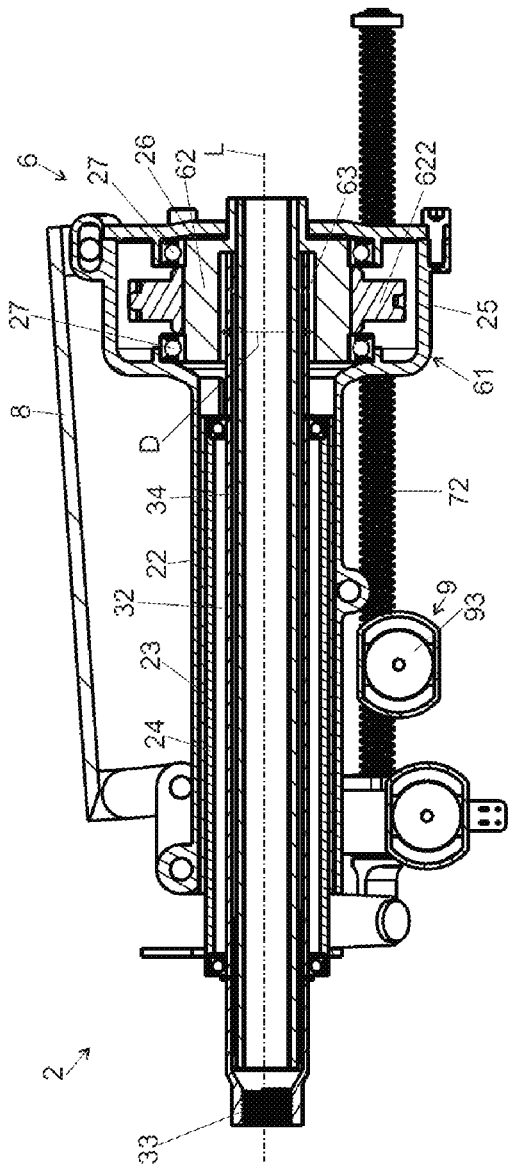
FIG. 7 is a longitudinal sectional view through the steering column as in FIG. 6 in a retracted state.

In the same longitudinal sectional view, FIG. 7 shows the retracted state of the steering column 2, in which state the intermediate casing tube 23 is pushed toward the front (to the right in FIG. 7) into the outer casing tube 22, and the inner casing tube 24 is pushed into the intermediate casing tube 23.

The feedback actuator 6 is attached in the front region to the outer casing tube 22 on the casing unit 21, and comprises a drive unit 61. The drive unit 61 has a bell-shaped housing 25 which is attached to the outer casing tube 22 in a manner which is open toward the front in a cup-like manner, and is preferably formed in one piece with the outer casing tube 22, for example as a shaped sheet metal part or cast metal part, or else can be manufactured from plastic material. A bearing cap 26 is flange-connected at the front on the opening of the housing 25 which has a greater diameter than the outer casing tube 22.

The drive unit 61 has a drive wheel 62 which is mounted such that it can be rotated coaxially with respect to the longitudinal axis L in bearings 27 in the housing 25. Here, the diameters of the drive wheel 62 and also of the bearings 27 can be greater than the diameter of the outer casing tube 22, as a result of which a particularly rigid bearing arrangement can be realized.

Figure 8:
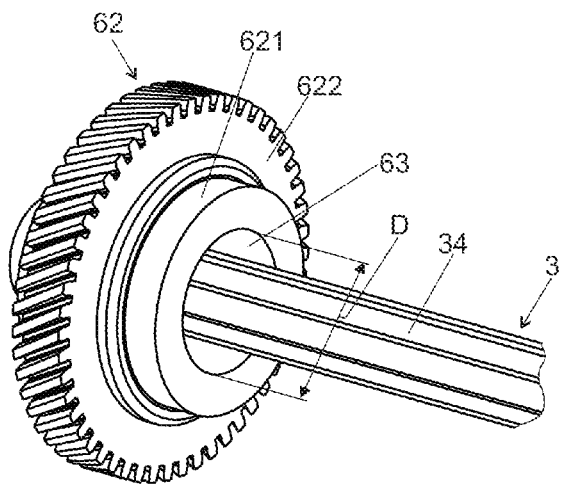
FIG. 8 is an exposed perspective partial view of an example drive unit of the steering column according to FIGS. 2 to 7.
Figure 9:
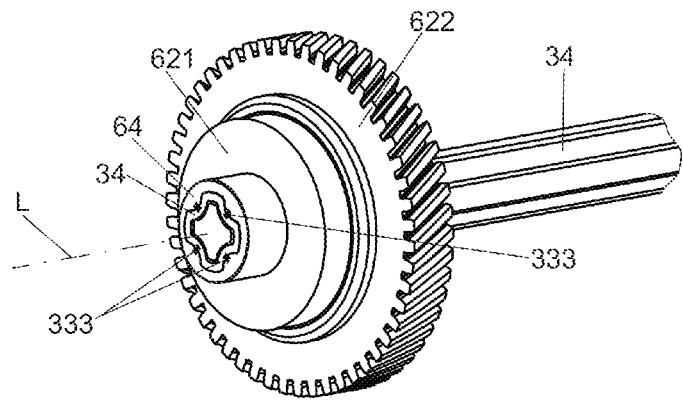
FIG. 9 is a further perspective view of the drive unit according to FIG. 8.
Figure 10:
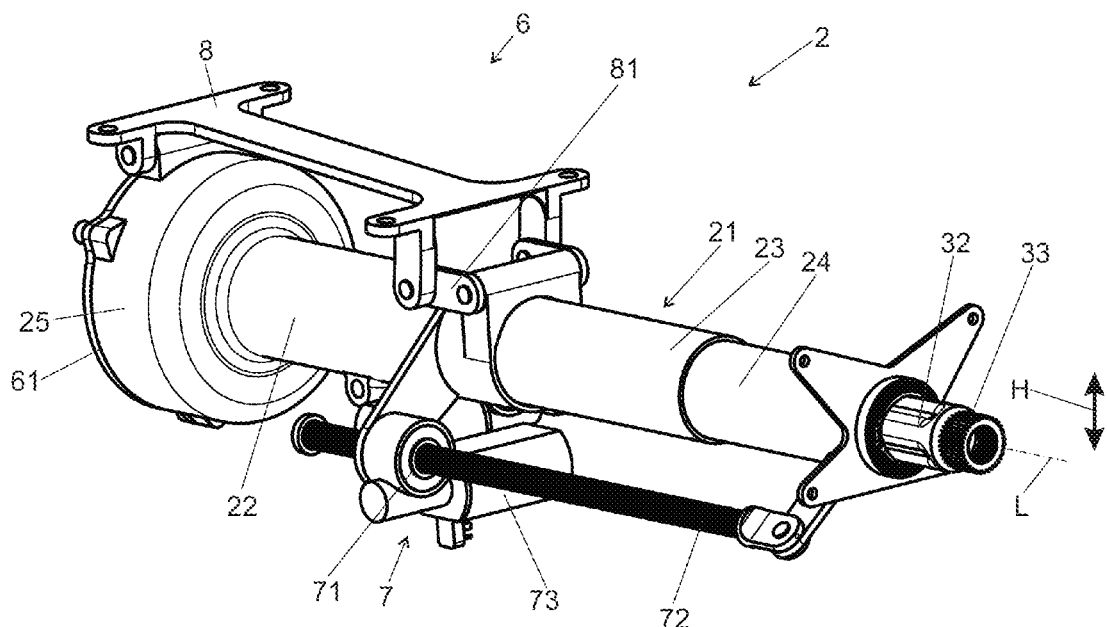
FIG. 10 is a diagrammatic perspective view of another example steering column.
Figure 13:
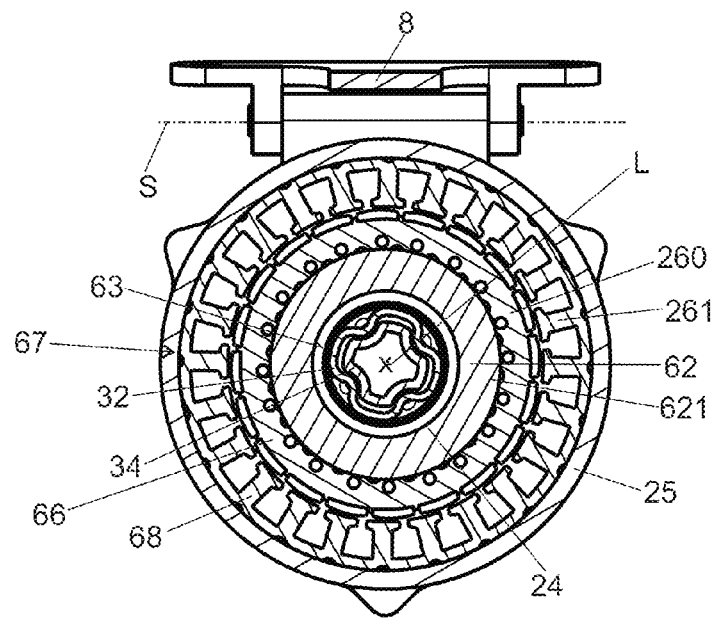
FIG. 13 is a cross-sectional view of the steering column according to FIGS. 10 to 12.
Figure 14:
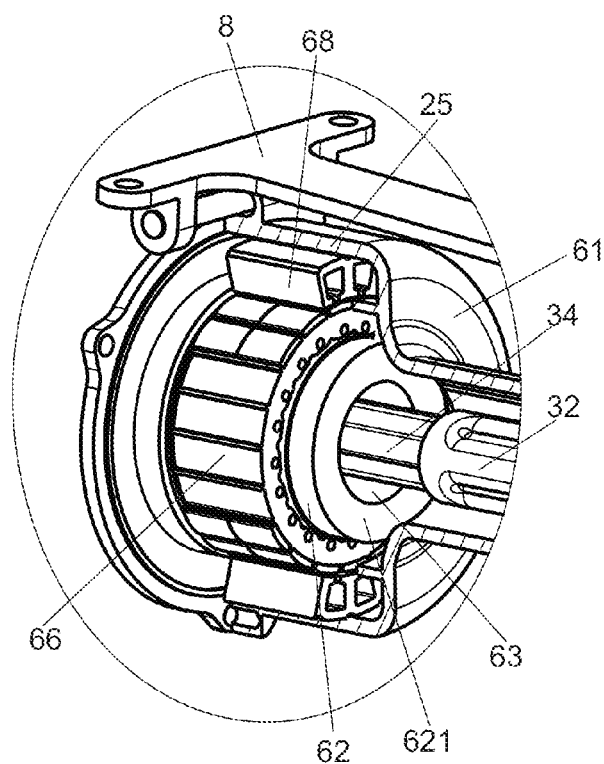
FIG. 14 is a partial cut-away view of the steering column according to FIGS. 10 to 13.

As can be seen in the exposed illustration of FIGS. 8 and 9, the drive wheel 62 has a hub 621 with a toothing system 622 which runs around on the outside. In the example which is shown, the toothing system 622 is configured as a worm toothing system, and can be molded as a plastic overmolded part on the hub 621 which is preferably manufactured from steel. The hub 621 and the inner shaft 34 are coupled to one another in a torque-transmitting manner, the inner shaft 34 being secured in the hub 621 in the direction of the longitudinal axis L by way of a calked portion 333 which is configured as a local plastic deformation. In other words, the hub 621 cannot be displaced with respect to the inner shaft 34.

The drive wheel 62 has a coaxial (cylindrical in the example) recess 63 which is open axially in relation to the steering spindle 3 toward the outer shaft 32, as can be seen in FIGS. 6, 7 and 8. The inner shaft 34 extends axially through the recess 63, and is connected in a connecting section 64 in a torque-transmitting manner to the front end region of the inner shaft 34. The annular space which remains free between the inner shaft 34 and the inner wall of the recess 63 is closed toward the front by way of the connecting section 64, with the result that a hollow-cylindrical blind opening is formed.

The recess has an internal diameter D which is greater than the external diameter A of the outer shaft 32. As a result, in the retracted state, as shown in FIG. 7, the outer shaft 32 can dip axially toward the front as far as into the drive wheel 62 of the drive unit 61. By virtue of the fact that the external diameter M of the inner casing tube 24 is greater than the internal diameter D, the inner casing tube 24 cannot dip into the recess 24, as can be seen in FIG. 7.

It can be seen from FIG. 7 that the arrangement which is formed from the inner casing tube 24, the intermediate casing tube 23 and the outer casing tube 22 is shorter in the maximum retracted state, as measured in the direction of the longitudinal axis L, than the inner shaft 34 which is pushed to a maximum extent into the outer shaft 32. The outer shaft 32 is mounted rotatably in the inner casing tube 24 which can also be called an internal casing tube, the outer shaft 32 protruding beyond both ends of the inner casing tube 24. By virtue of the fact that the outer shaft 32 can dip into the recess 63 of the drive wheel 62, a short stowage length is nevertheless realized in the retracted state.

In order to generate the feedback torque, the feedback actuator 6 has a motor 65, namely an electric motor, to the motor shaft of which a worm 651 is coupled. It can be seen from the cross-sectional view in FIG. 5 how the worm 651 meshes with the corresponding toothing system 622 of the drive wheel 62.

FIGS. 10 to 14 show a second embodiment of a steering column 2 according to the invention. As in the first embodiment, said steering column 2 has a drive wheel 62 with a hub 621 which, however, does not have a toothing system, but on which rather the rotor 66 of a motor 67 is arranged fixedly for conjoint rotation, the stator 68 of which is attached coaxially in the housing 25 fixedly for conjoint rotation. The bell-shaped housing 25 forms the motor housing. The drive wheel 62 directly has the rotor 66, that is to say forms the motor shaft as it were, with the result that a direct drive without further gear mechanism members is realized. The drive unit 61 is therefore integrated in a compact structural unit in the housing 25. The recess 63 and the associated advantages are as in the first design variant.

For longitudinal adjustment by way of telescoping extension or retraction of the casing unit 21, an adjusting drive 7 is provided which is configured as a spindle drive, with a spindle nut 71, into which the threaded spindle 72 is screwed. The spindle nut 71 can be driven rotationally relative to the threaded spindle 72 by an actuating motor 73. By virtue of the fact that the spindle nut 71 is supported on the outer casing tube 22 in the direction of the longitudinal axis L, and the threaded spindle 72 is supported on the inner casing tube 24, or vice versa, the casing unit 21 can be retracted or extended by motor depending on the rotational direction of the actuating motor 73.

For attachment to a body (not shown) of a motor vehicle, the steering column 2 has a carrying unit 8, by which the casing unit 21 is held. In order to realize a vertical adjustment, the casing unit 21 is mounted on the carrying unit 8 such that it can be pivoted about a pivot axis S which lies horizontally transversely with respect to the longitudinal axis L. The pivot axis S can preferably be arranged in the region of the housing 25 in the front region of the carrying unit 8. In the front region, the casing unit 21 is articulated on the carrying unit 8 via a movable pivoting lever 81. As a result, the steering wheel 31 which is attached to the rear end can be moved about the pivot axis S up and down in the vertical direction H.

For the vertical adjustment of the casing unit 21 relative to the carrying unit 8, an adjusting drive 9 is provided which is configured as a spindle drive, with a spindle nut 91, into which a threaded spindle 92 is screwed and which can be driven rotationally relative to the spindle nut 91 by an actuating motor 93. The threaded spindle 92 is supported in the direction of its axis on the carrying unit 21, and the spindle nut 91 is attached to the pivoting lever 81 in a stationary manner with regard to the rotation of the threaded spindle 92, and is supported in the direction of the axis of the threaded spindle 92. By way of rotational drive by means of the actuating motor 93, the pivoting lever 81 can be moved and, as a result, the casing unit 21 can be adjusted upward or downward in the vertical direction H relative to the carrying unit 8.

LIST OF DESIGNATIONS

1 Steering system
2 Steering column
21 Casing unit
22 Outer casing tube
23 Intermediate casing tube
24 Inner casing tube
25 Housing
26 Bearing cap
27 Bearing
3 Steering spindle
31 Steering wheel
32 Outer shaft
33 Fastening section
34 Inner shaft
35 Steering spindle bearing
4 Control unit
41 Rotary angle sensor
5 Steering actuator
51 Steering gear
52 Track rod
53 Wheel
6 Feedback actuator
61 Drive unit
62 Drive wheel
621 Hub
622 Toothing system
63 Recess
64 Connecting section
65 Motor
651 Worm
66 Rotor
67 Motor
68 Stator
7, 9 Adjusting drive
71, 92 Spindle nut
72, 92 Threaded spindle
73, 93 Actuating motor
8 Carrying unit
81 Pivoting lever
L Longitudinal axis
A External diameter
D Internal diameter
S Pivot axis

What is claimed is:

1. A steering column for a steer-by-wire steering system for a motor vehicle, the steering column comprising:

a casing unit in which a steering spindle is received so as to be rotatable about a longitudinal axis, the casing unit including an inner casing tube that is received coaxially in an outer casing tube such that the inner casing tube is displaceable telescopically in a direction of the longitudinal axis, wherein the steering spindle has an inner shaft that is received coaxially in an outer shaft in a torque-transmitting manner such that the inner shaft is displaceable telescopically in the direction of the longitudinal axis, wherein the steering spindle is connectable to a steering wheel; and a drive unit of a feedback actuator to which the steering spindle is coupled, wherein the feedback actuator includes an electric motor for generating and introducing a feedback torque into the steering spindle, wherein the drive unit includes a recess that
        is arranged coaxially with respect to the longitudinal axis,
        is open towards the outer shaft of the steering spindle, and
        has a maximum inscribed internal diameter that is greater than an external diameter of the outer shaft of the steering spindle, wherein the maximum inscribed internal diameter of the recess is smaller than an external diameter of the inner casing tube.

2. The steering column of claim 1 wherein a length of the inner casing tube or a length of the outer casing tube is smaller than a length of the outer shaft of the steering spindle.

3. The steering column of claim 1 comprising an intermediate casing tube that is disposed in a telescopically adjustable manner between the inner casing tube and the outer casing tube.

4. The steering column of claim 1 wherein the drive unit includes a drive wheel that
    coaxially surrounds the recess at least partially,
    is configured to be coupled to the steering spindle, and
    is configured to be driven rotationally by the electric motor.

5. The steering column of claim 4 wherein the drive wheel is connected to the inner shaft of the steering spindle.

6. The steering column of claim 5 wherein the drive wheel is configured as a gear mechanism wheel that is connected via a gear mechanism to the electric motor.

7. The steering column of claim 5 wherein the drive wheel is configured integrally with a rotor of the electric motor.

8. The steering column of claim 1 wherein the steering spindle is connected to the drive unit at a front end region of the steering spindle that dips axially into the recess.

9. The steering column of claim 1 wherein the drive unit is attached to the outer casing tube.

10. The steering column of claim 1 wherein the casing unit includes a bell-shaped housing of the drive unit.

11. The steering column of claim 1 comprising a motorized adjusting drive that acts between the inner casing tube and the outer casing tube, wherein the motorized adjusting drive is configured for relative displacement in the direction of the longitudinal axis.

12. The steering column of claim 1 wherein the casing unit is held in a carrying unit that is connectable to a body of the motor vehicle.

* * * * *